Figures 1, 2:
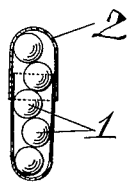

Oct. 13, 1964    KENSO KUSAKA    3,152,573
METHOD OF POULTRY RAISING AND THE SUPPLY MATERIAL THEREOF
Filed Aug. 27, 1962

INVENTOR.
KENSO KUSAKA
BY McGlew and Toren
ATTORNEYS

3,152,573
METHOD OF POULTRY RAISING AND THE SUPPLY MATERIAL THEREOF
Kenso Kusaka, 30 Aza Saijo Higashi, Saijo-cho, Kamogun, Japan
Filed Aug. 27, 1962, Ser. No. 219,704
Claims priority, application Japan, Aug. 31, 1961, 36/31,635
4 Claims. (Cl. 119—1)

The present invention relates to a method of poultry raising and a digestion aiding material used in practicing the method.

It is a well known fact that poultry do not have teeth and that the digestion of food thereby is not performed in the mouth, but rather is performed in the muscular stomach, or gizzard, with the aid of small pebbles or the like which are swallowed by the poultry. Such small pebbles, or the like, convert to smaller granules, or particles in about one week in grown chickens, and therefore they have to be supplied with the small pebbles often. Moreover, the use of pebbles is disadvantageous in that the smaller granules, or particles, which are eventually produced get into the intestinal canal and interfere with the absorption of nutrition through the intestinal walls thereof. One object of the present invention is to eliminate such disadvantages.

Another object of the invention is to provide a novel method of poultry raising and a digestion aiding material therefor, wherein the material serving as the digestion aiding medium is supplied to the poultry to enhance the digestion of feed. As as result, less feed is used and the rate of laying of eggs is increased.

Another object of the invention is to provide a method of poultry raising and a digestion aiding material therefor, wherein said material, according to this invention is retained longer in the muscular stomach, or gizzard, and the necessity of frequently supplying small pebbles, or the like, as in the conventional method, is eliminated.

Still another object of the invention is to provide a method of poultry raising and a digestion aiding material therefor, wherein said material, in various sizes proper to the required degree of the growth of the poultry as well as for full grown poultry, is obtainable at low cost and in large quantity.

Another object of the invention is to provide a method of poultry raising and a digestion aiding material therefor, wherein the mode of supplying the material is simple, without producing harmful effects, and wherein the excess material supplied is easily disgorged.

In view of the above-mentioned objects and other objects that appear hereinafter, the invention is described in the following specification and hereinafter defined in the claims.

In the accompanying drawing:

FIG. 1 is a perspective view of one of the glass beads employed in accordance with the invention; and, FIG. 2 is a view of a longitudinal section of a capsule containing a number of such glass beads.

According to one embodiment of the invention, as shown in the accompanying drawings, numeral 1 indicates a glass bead of a desired size, which is about 3 mm. in diameter for medium-sized chicks and 6 mm. in diameter for full grown chickens. The shape of the bead 1 may be spherical, as shown, or elliptical. Numeral 2 indicates a capsule, composed of mainly starch, in which glass beads 1 of a proper number are enveloped for supply to the chickens. For example, to the medium-sized chicks, which have been hatched about 60 days, there is supplied ten such glass beads of about 3 mm. diameter directly; or, two capsules each containing five glass beads of 3 mm. diameter may be supplied. Grown chicks hatched 150 days or more are supplied with ten glass beads of about 6 mm. diameter directly; or, two capsules each containing five of the glass beads of the same diameter may be supplied. Each chick is held in the hand and its bill is forced open for the insertion of the capsule, or capsules, containing the glass beads. The glass beads contained in the capsule or capsules enter the craw of the chick through its first esophagus where the capsules melt. After the capsules have melted, or dissolved, in the first esophagus only the glass beads remain and eventually they enter the gizzard, or muscular stomach, via the second esophagus and via the fore-stomach. The glass beads then remain in the gizzard or muscular stomach. The capsules are a convenient way of administering the glass beads to the chicks because a predetermined number of glass beads may be contained within each capsule and thereby a known number of glass beads may be supplied to the chicks. Another convenience in using the capsule is that the capsule may be filled with other forms of chicken feed as well as with the glass beads. However, if desired, the capsules may be dispensed with and a predetermined number of glass beads may be supplied to the chick by hand by forcing its bill open and administering the beads one-by-one to cause the beads to enter the craw of the chick and eventually become deposited in the gizzard.

In the medium-sized chickens (those hatched about 150 days) and even in young chicks, the glass beads serve as the digestion aiding medium for about four months in the gizzard, or muscular stomach, and increase their digestive powers. As a result, their rate of growth is promoted and an increase in the rate of the laying of eggs is achieved.

On the other hand, ten of the glass beads of about 6 mm. diameter contained in one capsule may be used directly, or two capsules each containing five of the beads of the same diameter may be fed to the grown chickens.

Heretofore in the prior art it has been found that when in the gizzard, or muscular stomach, the quartz particles, or other grit material, used abraded and eroded to a considerable extent within a week's time so that eventually they moved into the intestines and did not aid in the digestion process, i.e. serve as a substitute for teeth. However, the glass beads employed according to the present invention have through experiments indicated that each bead diminishes in size due to abrasion and/or erosion by about ⅓ of its its original size in about 100 days. Accordingly, the glass beads, according to the present invention, will serve as a digestion aiding media for about six months. Moreover, the glass beads, according to the present invention, have been found to resist erosion effects due to the acids found in the internal organs of the chicks.

In an experiment involving 150 hens comprising three groups wherein a first group was fed with beads according to the present invention, a second group grits according to the prior art and a third group fed with ordinary feed, the following results were observed:

The group of hens fed with the beads according to the present invention showed an increased egg production of 8% higher than the grit fed group and 12% higher than the group fed with ordinary feed.

As the glass beads according to this invention are so constituted as described hereinabove giving a greater effectiveness as compared with the conventional method of supplying with small pebbles, etc., thereby achieving the objects hereinbefore stated.

In the foregoing, an embodiment according to the present invention has been described, but the present invention is not limited to the above-described embodiment, and it is apparent that this invention includes all the

I claim:

1. A poultry raising method comprising the steps of: supplying nutrient-containing feed material to the poultry on a regular substantially daily basis; and, supplying at least two spherical glass beads of from about 3 mm. to 6 mm. in diameter to the poultry for masticating said feed material at least once during each four month period.

2. A poultry raising method comprising: supplying nutrient-containing feed material to the poultry on a regular basis such as daily; and, supplying at least one soluble capsule containing a plurality of generally round glass beads of from about 3 mm. to 6 mm. in diameter to the poultry at least once during every four month period.

3. The method, according to claim 1, characterized further in that each bead is about 3 mm. diameter for medium size poultry and about 6 mm. diameter for full grown poultry.

4. A poultry feed supplement for masticating nutrient-containing feed for poultry comprising: a capsule of a material soluble in digestive juices of the poultry; and, a plurality of spherical acid-resistant glass beads contained in said capsule and being of about from 3 mm. to 6 mm. in diameter, said beads on dissolution of said capsule being enabled to enter the gizzard.

References Cited in the file of this patent

UNITED STATES PATENTS 2,986,571  Ohodaira _____ July 9, 1959

OTHER REFERENCES

Feeds & Feeding, by Frank Morrison, 22nd edtion, published by The Morrison Publication Co., 1957, Ithaca, N.Y., page 941, para. 1514 relied upon.